United States Patent
Naidu et al.

(10) Patent No.: US 7,962,635 B2
(45) Date of Patent: Jun. 14, 2011

(54) SYSTEMS AND METHODS FOR SINGLE SESSION MANAGEMENT IN LOAD BALANCED APPLICATION SERVER CLUSTERS

(75) Inventors: Aditya Naidu, Edison, NJ (US); Rajesh Talpade, Madison, NJ (US); Harshad Tanna, Plainsboro, NJ (US); Sabine Winchell, Hillsborough, NJ (US)

(73) Assignee: Telcordia Technologies, Inc., Piscataway, NJ (US)

( * ) Notice: Subject to any disclaimer, the term of this patent is extended or adjusted under 35 U.S.C. 154(b) by 53 days.

(21) Appl. No.: 12/631,881

(22) Filed: Dec. 7, 2009

(65) Prior Publication Data

US 2010/0217860 A1  Aug. 26, 2010

Related U.S. Application Data

(60) Provisional application No. 61/154,922, filed on Feb. 24, 2009.

(51) Int. Cl.
G06F 15/16 (2006.01)
(52) U.S. Cl. ......... 709/229; 709/227; 709/228; 709/224
(58) Field of Classification Search .................. 709/223, 709/224, 225, 226, 227, 228, 229, 217; 713/185; 707/705
See application file for complete search history.

(56) References Cited

U.S. PATENT DOCUMENTS

| | | | |
|---|---|---|---|
| 2005/0091511 A1* | 4/2005 | Nave et al. | 713/185 |
| 2006/0098795 A1 | 5/2006 | Choti et al. | |
| 2006/0143290 A1* | 6/2006 | Dostert et al. | 709/224 |
| 2006/0155756 A1* | 7/2006 | Stanev et al. | 707/705 |
| 2006/0212589 A1* | 9/2006 | Hayer et al. | 709/229 |
| 2006/0248198 A1* | 11/2006 | Galchev | 709/227 |
| 2006/0282509 A1* | 12/2006 | Kilian et al. | 709/217 |
| 2007/0220155 A1* | 9/2007 | Nalla et al. | 709/227 |

OTHER PUBLICATIONS

Telcordia Technologies, Inc., "IP Assure," MC-AR-BR-012, 2008.
Telcordia Technologies, Inc., "IP Assure: In the Cloud Computing Environment," MC-AR-BR-015, 2009.
Telcordia Technologies, Inc., "Towards Fool-Proof IP Network Configuration Assessment," White Paper, 2008.

* cited by examiner

Primary Examiner — Le Luu
(74) Attorney, Agent, or Firm — Philip J. Feig

(57) ABSTRACT

Aspects of the invention pertain to user session management in load balanced clusters. Multiple application servers communicate with a central data server to ensure there is a single session per user ID. The central data server maintains a user session index and a parameter table. Each time a network access is attempted using a given user ID, a load balancer assigns the session to one of the application servers. The assigned application server queries the central data server to determine whether a session status for the user's login ID is inactive or active. If inactive, a new, unique value is assigned as the session number. If active, the session number is evaluated to determine whether multiple sessions exist. In this case, one of the sessions is terminated to ensure a single session per user ID. Preferably, the terminated session is the earlier session.

19 Claims, 5 Drawing Sheets

100

200

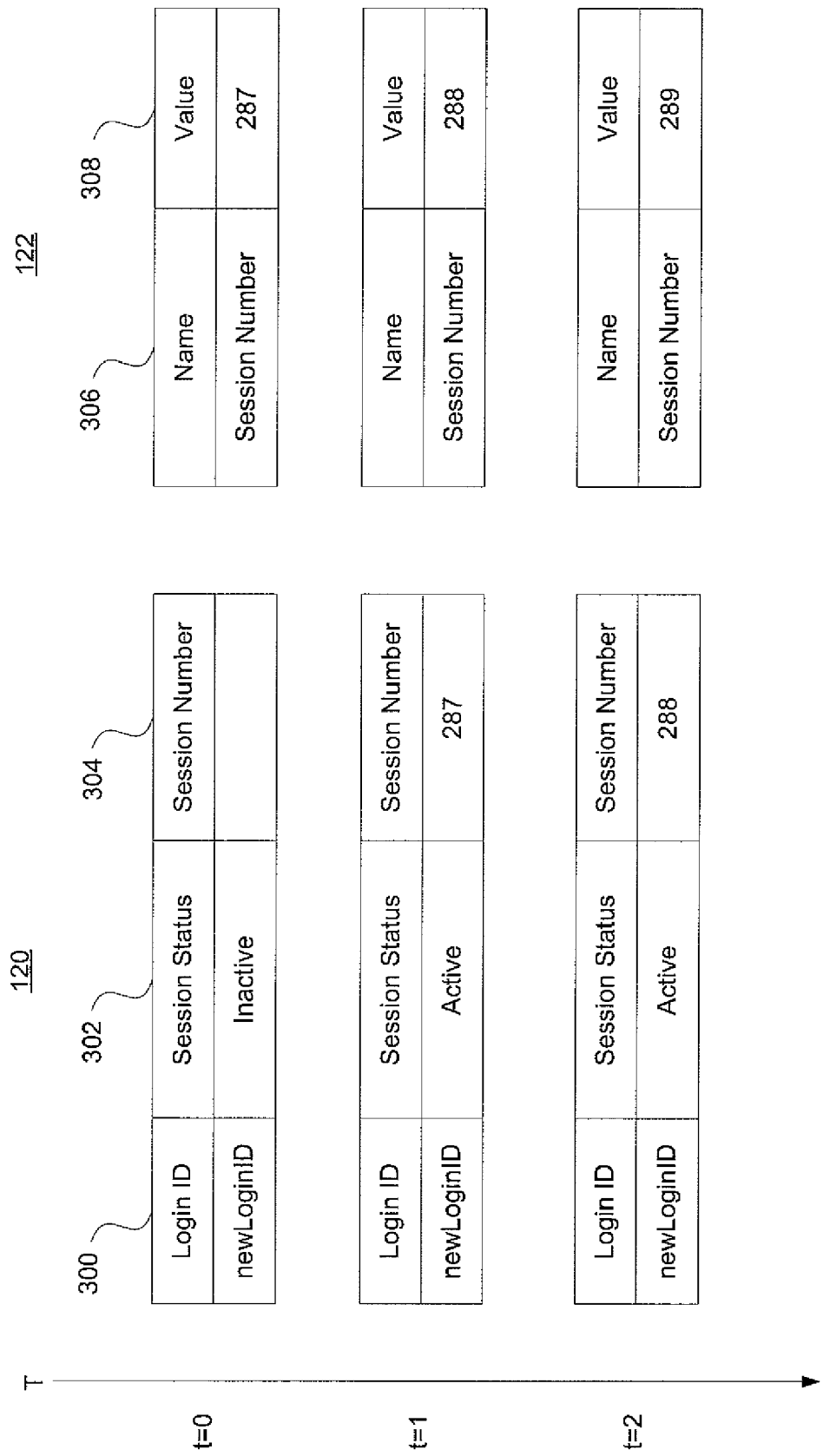

SYSTEMS AND METHODS FOR SINGLE SESSION MANAGEMENT IN LOAD BALANCED APPLICATION SERVER CLUSTERS

CROSS-REFERENCE TO RELATED APPLICATION

The instant application claims the benefit of U.S. Provisional Patent Application No. 61/154,922, entitled "Method and System for a Single Session Per Login ID in a Load Balanced Application Server Cluster," filed Feb. 24, 2009, the entire disclosure of which is hereby expressly incorporated by reference herein.

BACKGROUND OF THE INVENTION

1. Field of the Invention

The invention generally relates to networks employing multiple application servers. More particularly, aspects of the invention are directed maintaining a single session per user login in application server clusters.Ps 2. Description of Related Art In many networks there may be multiple servers or other computers that provide content to users. The workload may be shared among different servers. A group of such servers may distribute client requests among the servers in a load balancing operation. This is known as a load-balanced cluster. Distributing the load helps speed up request processing, which in turn helps shorten response time to the users.

FIG. 1 illustrates a conventional load balanced network 10. As shown, one or more user devices 12a-12n may connect to different servers 14a-14m in the network. Load balancer 16 is positioned in the network between the user devices and the servers. Different load balancing schemes may be used to decide which traffic to route to different servers.

Users may log into or otherwise access the network via different user devices. Each time the user attempts to access the system, he or she may be required to log in, such as with a user name and password. Unfortunately, conventional load balanced systems may have difficulty managing multiple accesses from such users.

SUMMARY OF THE INVENTION

In accordance with aspects of the invention, systems and methods are provided to maintain a single session per user login in load balanced architectures.

In one embodiment, a method of session management in a computer network is provided. The method comprises receiving a request from a client device via the computer network, the request including a login identifier associated with a user; assigning the request to an application server from among a plurality of application servers; the assigned application server determining whether a session associated with the login identifier is active; if the session is active, the assigned application server determining whether a received session number associated with the login identifier is the same as a session number stored in a central data server of the computer network; and if the received session number is not the same as the stored session number, then invalidating the session associated with a selected one of the stored session number and the received session number.

In an example, invalidating the session includes querying the client device as to which session is to be invalidated. In another example, the session associated with the stored session number is invalidated.

In one alternative, if the session is inactive, the method further comprises the assigned application server obtaining a session number from a parameter table of the central data server; setting the session number to be associated with the login identifier in a user session index of the central data server; and incrementing the session number to a next session number in the parameter table. In this case, obtaining the session number, setting the session number and incrementing the session number may be performed as an atomic operation. Optionally, wherein the session number is incremented monotonically. And in a variation, the assigned server maintains session information for a given session, and the session number obtained from the central data server stored as part of the session information by the assigned server.

In a further example, the assigned server maintains any session information for a given session, and the session information is not managed by other ones of the plurality of application servers.

In another embodiment, a system for session management is provided. The system comprises a plurality of application servers and a central data server. Each application server includes memory for storing data and instructions, as well as a processor for executing the instructions and managing the data. The central data server is coupled to each of the application servers. The central data server includes a user session index and a parameter table. During operation, upon receiving a request from a client device, the request is assigned to one of the plurality of application servers. The request includes a login identifier associated with a user. The assigned application server is configured to determine whether a session associated with the login identifier is active. If the session is active, the assigned application server determines whether a received session number associated with the login identifier is the same as a session number stored in the central data server. And if the received session number is not the same as the stored session number, then the session associated with a selected one of the stored session number and the received session number is invalidated.

In one example, the session associated with the stored session number is invalidated by the application server managing that respective session. In another example, if the session is inactive, the assigned application server obtains a session number from the parameter table of the central data server, sets the session number to be associated with a login identifier in the user session index of the central data server, and increments the session number to a next session number in the parameter table of the central data server. In this case, the assigned application server preferably obtains the session number, sets the session number and increments the session number as an atomic operation. Desirably, the session number is incremented monotonically by the assigned application server.

In this case, the assigned application server preferably maintains session information for a given session, and the session number obtained from the central data server is stored as part of the session information by the assigned application server. Here, the session information is desirably not managed by other ones of the plurality of application servers.

And in another example, each of the plurality of application servers periodically polls the central data server to determine session status of sessions handled by each respective application server.

In a further embodiment, an apparatus for session management in a computer network is provided. The apparatus comprises an application server including memory for storing session information and instructions, and a processor for executing the instructions and managing the session information. The application server is coupled to a central data server storing a user session index and a parameter table for sessions of the computer network. During operation, upon receiving a request from a client device, the request is assigned to the application server. The request includes a login identifier associated with a user. The application server is configured to determine whether a session associated with the login identifier is active. If the session is active, the application server determines whether a received session number associated with the login identifier is the same as a session number stored in the central data server. And if the received session number is not the same as the stored session number, then the session associated with a selected one of the stored session number and the received session number is invalidated.

In one alternative, if the session is inactive, the application server obtains a session number from the parameter table of the central data server, sets the session number to be associated with a login identifier in the user session index of the central data server, and increments the session number to a next session number in the parameter table of the central data server. In this case, the application server desirably obtains the session number, sets the session number and increments the session number as an atomic operation.

BRIEF DESCRIPTION OF THE DRAWINGS

FIG. 5 illustrates session management information in accordance with aspects of the invention.

DETAILED DESCRIPTION

Aspects, features and advantages of the invention will be appreciated when considered with reference to the following description of preferred embodiments and accompanying figures. The same reference numbers in different drawings may identify the same or similar elements. Furthermore, the following description is not limiting; the scope of the invention is defined by the appended claims and equivalents.

Figure 1:
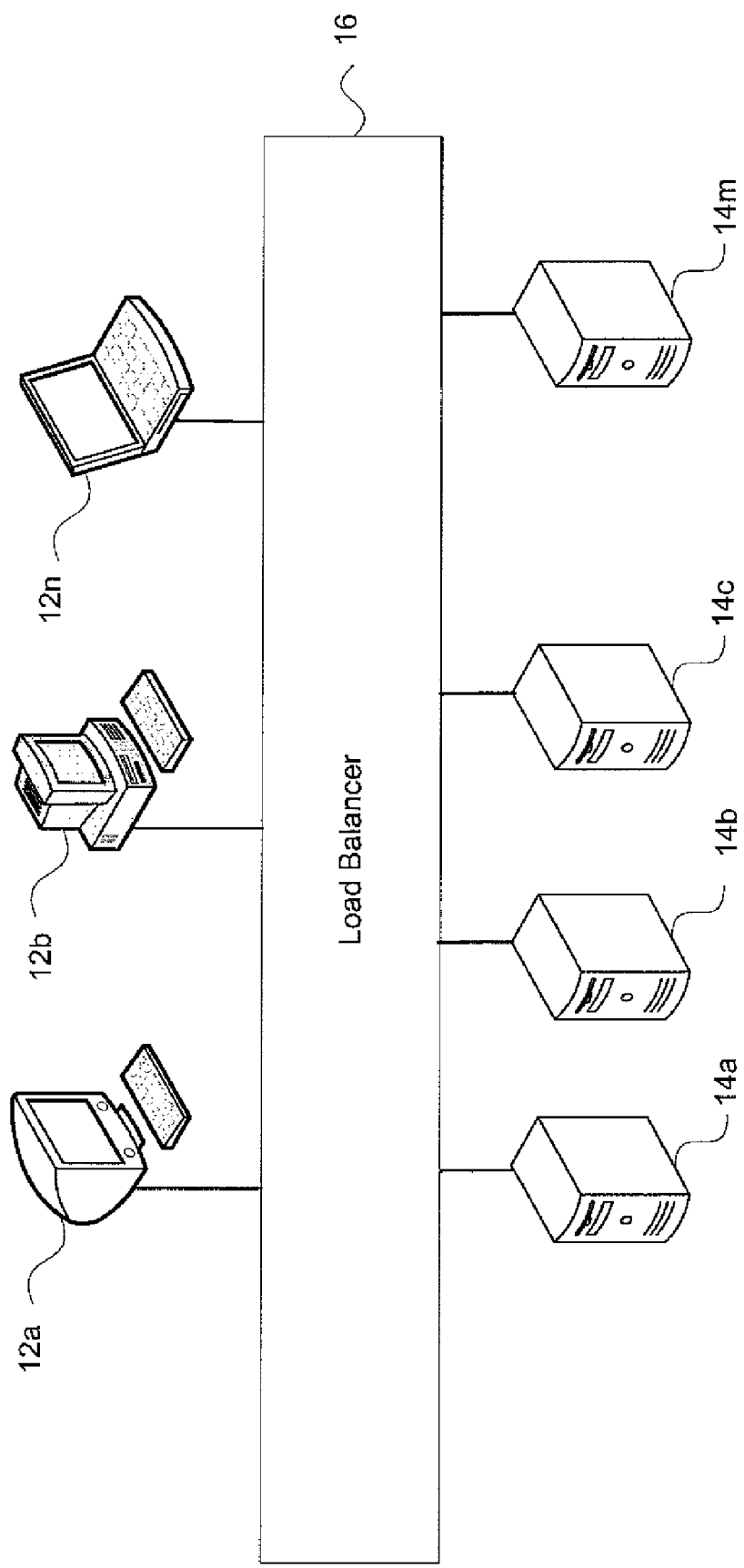
FIG. 1 illustrates a conventional load balanced system.
Figure 2:
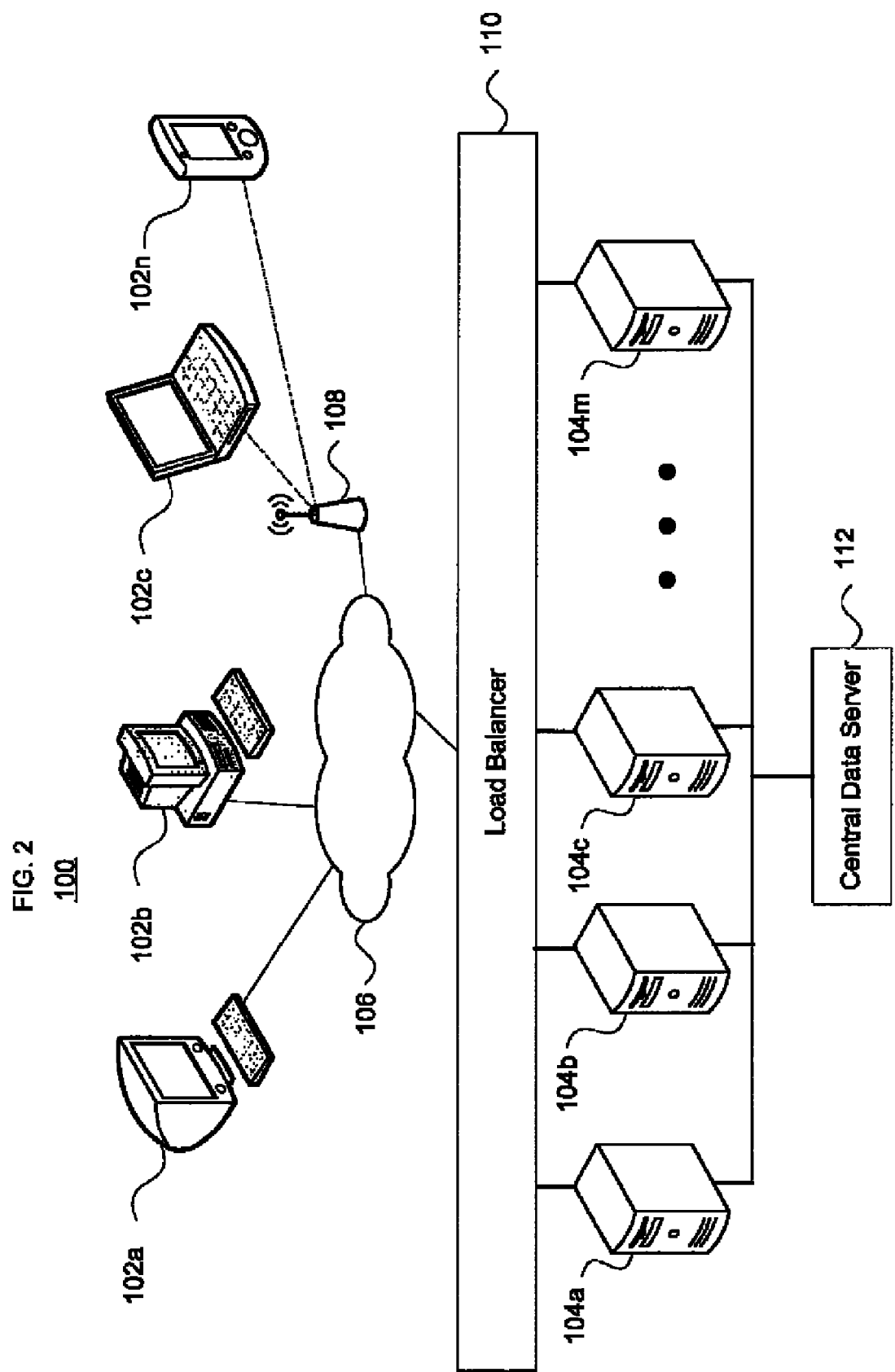
FIG. 2 illustrates a load balanced network in accordance with aspects of the invention.

FIG. 2 illustrates a load balanced system 100, which permits various user devices 102a-102n to connect to different servers 104a-104m in the system. The user devices can include desktop and laptop computers, palmtop computers, PDAs, mobile phones and other computing devices. The user devices may connect to the servers via a network 106 and load balancer 110. The network 106 has multiple nodes which may include wired connections such as routers (e.g., for computers 102a and 102b) and/or wireless access points 108 (e.g., for devices 102c and 102n). As shown, load balancer 110 passes information such as data packets between the user devices and the servers via the network 106. A central data server 112 also couples to the servers.

In this example, the servers 104 are application servers that may share or manage the same application(s). Such applications may include, for instance, on-line shopping, banking or other e-commerce transactions.

Figure 3:
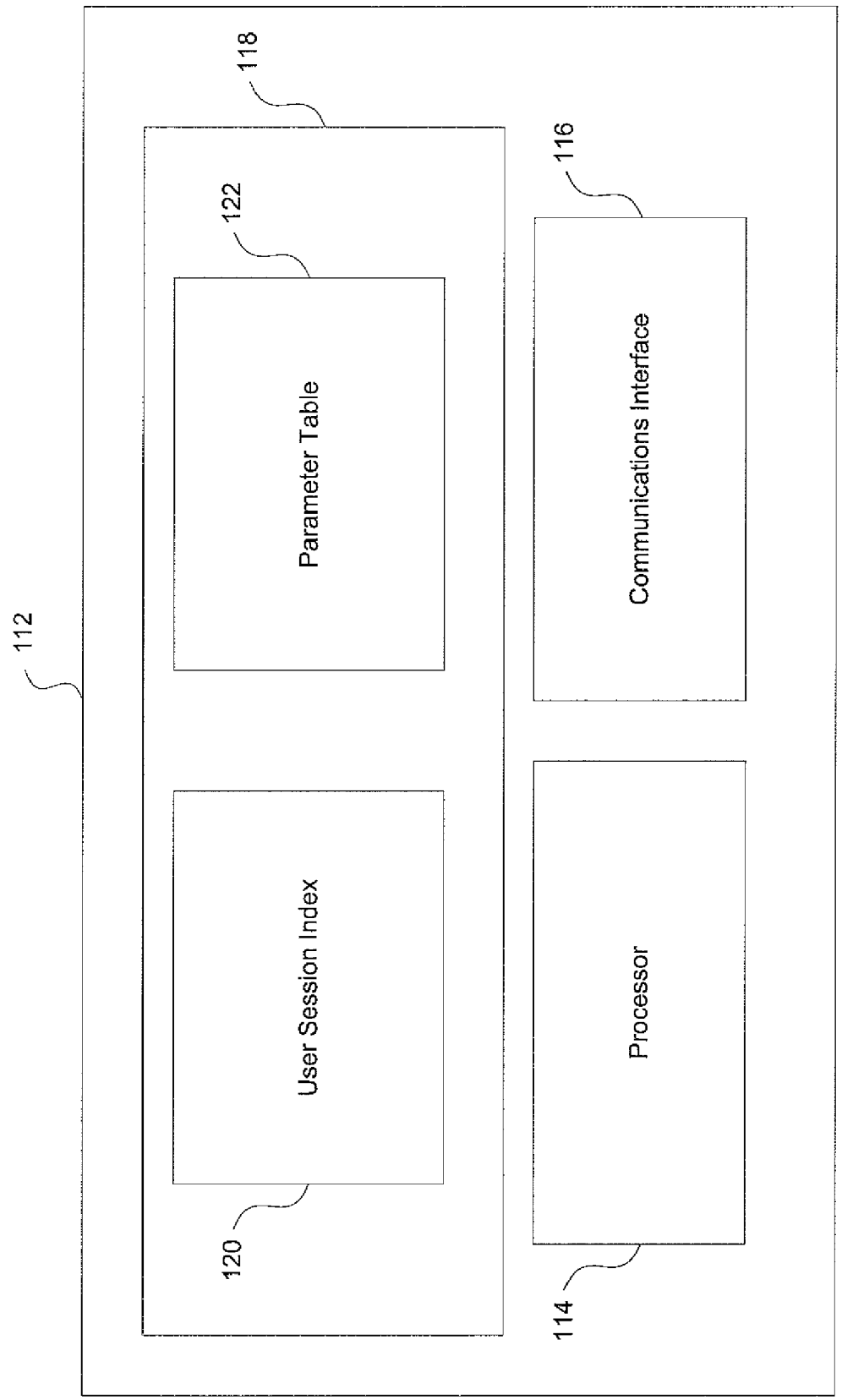
FIG. 3 illustrates a central data server in accordance with aspects of the invention.

As shown in FIG. 3, the central data server 112 includes a processor 114 for managing operation of the central data server and executing server operations, a communications interface 116 for communicating with the servers 104, and memory 118 for storing instructions that may be executed by the processor and data that may be retrieved, manipulated or stored by the processor. The servers 104, load balancer 106 and user devices 102 also include a processor and communications interface. Other components of these devices, such as a keyboard, mouse and/or various other types of input devices, a display, power supply, etc. are not shown.

The processor 114 may comprise any number of well known hardware-based processors, such as a CPU from Intel Corporation or Advanced Micro Devices. Alternatively, the processor may be a dedicated controller for executing operations, such as an ASIC. The memory 118 desirably includes a user session index 120 and a parameter table 122 as will be explained in more detail below. The memory may be of any type capable of storing information accessible by the processor, such as a hard-drive, ROM, RAM, CD-ROM, DVD, flash memory, write-capable or read-only memories.

Although the processor 114 and memory 118 are functionally illustrated in FIG. 3 as being within the same block, it will be understood that they may actually comprise multiple processors and memories that may or may not be stored within the same physical housing or location. For example, some or all of the instructions and data in memory may be stored on a removable CD-ROM or other recording medium and others within a read-only computer chip. Some or all of the instructions and data may be stored in a location physically remote from, yet still accessible by, the processor. Similarly, the processor may actually comprise a collection of processors or sub-processing units which may or may not operate in parallel. Data may be distributed and stored across multiple memories such as hard drives or the like.

A user may access the load-balanced system from a particular user device 102. In one embodiment the user logs in from the user device using a predefined login identifier ("ID"), such as a username and password. Then data packets, which may include a request for information (e.g., a web page or a map), are passed to a given server 104 as selected by the load balancer 110. When the user logs in, a session is assigned to the user's login ID.

It is possible for the user to access the system from one user device 102 while he or she is already logged in from another user device 102. It is also possible for a session to be maintained even though the user has attempted to log off or otherwise terminate the session. Either situation may cause management or routing issues due to conflicting sessions.

Figure 4:
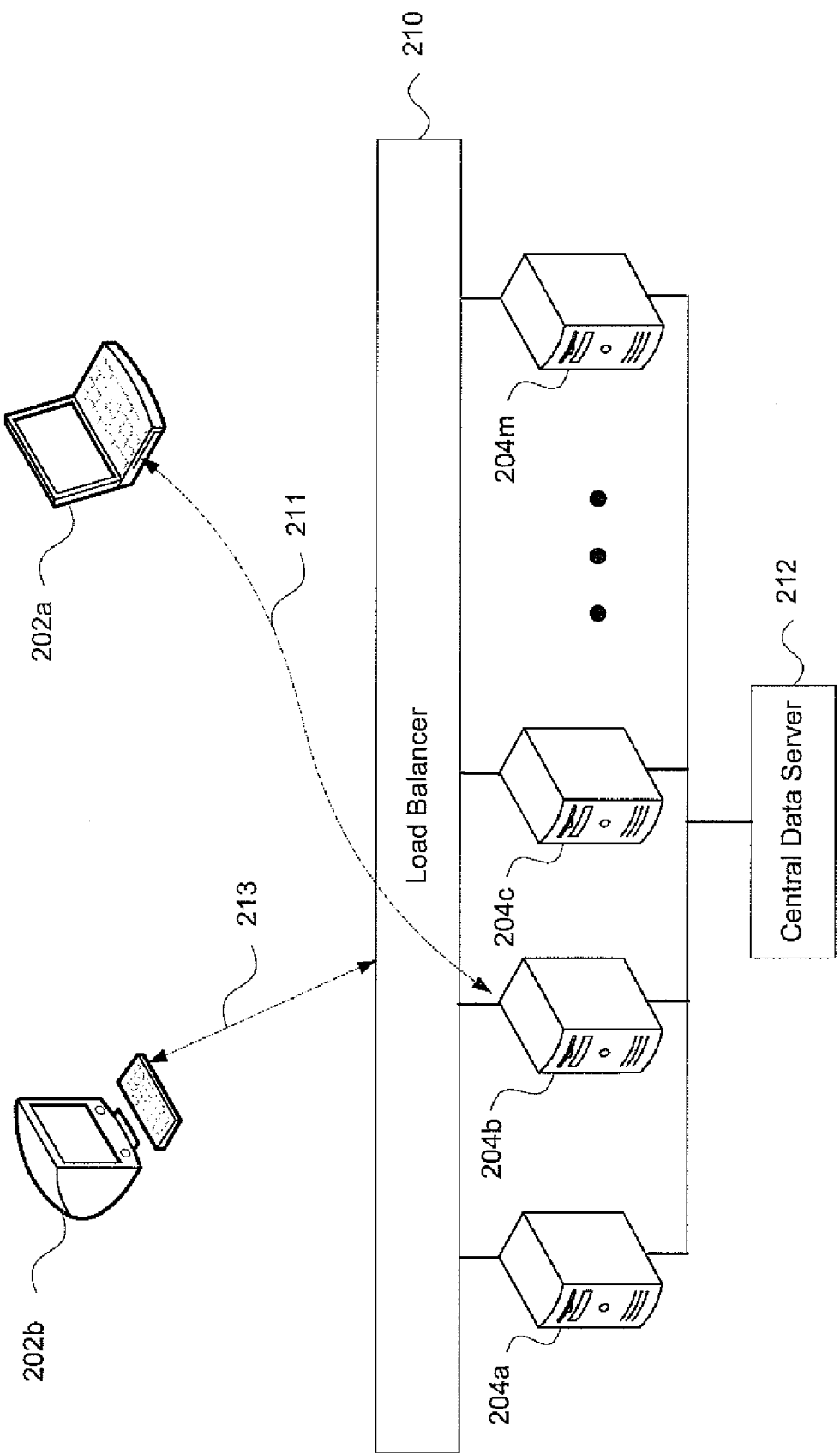
FIG. 4 illustrates further aspects of a load balanced network in accordance with the invention.

For instance, FIG. 4 shows a network scenario 200 where a user first accesses the load balanced system by logging in from laptop 202a. In this example, the load balancer 210 routes packets to application server 204b as shown by the dotted line 211. Subsequently, a new access attempt is made from computer 202b using the same login credentials (ID) that were used with laptop 202a, as shown by the dotted line 213. Central data server is coupled to each of the application servers 204. If multiple session IDs for the same login credentials are permitted, the load balancer 210 may route the packets to a different application server 204. This may violate software license agreements or network policies, and may create conflicting actions for the same login ID. Therefore, it is desirable to only have a single session ID per login ID.

Different techniques are possible to manage single session IDs for a given login ID. For instance, the load balancer or other device may act as a gatekeeper between the user device and the application servers. Alternatively, all session data for all sessions in the system may be stored in a predetermined server. Here, when a request arrives at a server in the cluster, the server queries the predetermined server to check for multiple sessions for that login ID along with all other session information.

Yet another approach is for all application servers to exchange all session data with one another. However, this approach is not scalable as it requires a full mesh with n(n−1)/2 connections, where n represents the number of application servers in the cluster. It should be understood that this approach may take up significant network bandwidth, processing power and memory.

In contrast to these approaches, the embodiment of FIGS. 2-4 employs a central data server in conjunction with an application server to manage user sessions. For instance, as shown in FIG. 3, the central data server 112 employs the user session index 120 and parameter table 122 to ensure a single session per login ID. Turning to FIG. 5, details of the user session index 120 and parameter table 122 are shown. Here, the user session index 120 includes a user login ID 300, a session status 302 and a session number 304. And the parameter table 122 includes a name field 306 and a value field 308. The name field 306 preferably stores the session number. And the value field preferably stores a unique value such as an integer. While a single row is shown, it should be understood that the user session index may include multiple rows with one user ID per row.

The user session index 120 and parameter table 122 are shown varying over time in response to repeated user login attempts. Thus, time t=0 may be just prior to a user logging in. Here, the user's login ID ("newLoginID") is shown as inactive. The parameter table 122 shows that the next available session number is 287. Then, at time t=1, someone logs into the system using login ID newLoginID. As shown in the user session index 120 now, this login ID has an "Active" session status and is assigned session number 287. The parameter table 122 then increments the next available session number to be 288. Next, at time t=2, another login is performed using the same login ID. Again, the session status is active, and the new session is set to number 288. The value is incremented in the parameter table to 289. The system, preferably a specific application server, determines that there are multiple sessions for the same login ID by evaluating the session numbers. In this case, the system preferably terminates the earlier session when two session numbers are found. In one scenario, the application server handling the old session will terminate its session. Preferably, only the application servers can determine multiple sessions for the same login ID.

In one example, when a login is conducted using a given login ID, the load balancer assigns one of the application servers to manage the session for that login ID. That server performs the following actions if the session status for the login ID is inactive. First, the assigned server gets the current session number (e.g., the next available session number) from the parameter table. Next, it increments the session number in the parameter table. Then, it assigns the current session number obtained from the parameter table to the given login ID. These latter two actions may be performed in reverse order.

Preferably, these actions are performed as a single atomic operation. In other words, all three actions are performed by the server without stopping. In addition, the session number in the parameter table is desirably incremented monotonically to ensure that when a session number is assigned to a given login ID, it will be unique across the whole system.

In one scenario, every time an application server initializes a session for a given login ID, that server checks the value of session status for that login ID with the information maintained at the central data server. If the login ID is inactive, then the above process creates a session for that login ID. If its status is active, then one of the sessions will be invalidated or otherwise cancelled. Preferably, the older session is cancelled/invalidated.

In an example, the user may log in and the load balancer assigns server A to handle the session. Server A communicates with the central data server to check the session status and assign a session number if the status is inactive. If the status is active, then the user attempting to log on in a new session may be given the option to override the current session. The current session may be served by a different application server than the one to which the load balancer has assigned the new session. If the current session is overridden, then the session number for the given login ID is updated with the next value from the parameter table. If the current session is not overridden, then the new session is terminated.

It is possible for different application servers to be assigned different sessions for the same user ID by the load balancer. Preferably, every time an application server needs to service a request it checks the session number against the login ID in the user session index with the one that it has for the same login ID in the session information. This may be done by regularly polling the user session index of the central data server. If the session numbers don't match, then one of the sessions is invalidated. For instance, in FIG. 5 the old session number from time t=1 is 287, which does not match session number 288 from time t=2. Preferably, the application server that is serving the old session (287) will invalidate that session. This ensures that there is only one session per login ID.

In the present embodiment, all user information for a session handled by a particular application server is desirably maintained by that application server. Such user information or session-specific information (collectively "session information") may include, by way of example only, the shopping cart status for an order, page viewing status for a web page, etc. Here, other servers do not store or manage the user information for a session handled by another server.

Session information includes the session number obtained from the parameter table of the central data server. The particular application server need only query the central data server to confirm whether the current session is unique for a given login ID. This solution enables the system to override an existing session to avoid multiple sessions for the given login ID.

Maintaining such information at the application server reduces the bandwidth, processing power and memory needed for session management. However, it ensures a single session for a login ID in a load balanced application server cluster environment. This reduces development and maintenance costs, as well as system complexity.

Although aspects of the invention herein have been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the invention as defined by the appended claims.

The invention claimed is:

1. A method of session management in a computer network, the method comprising:
   receiving a request from a client device via the computer network, the request including a login identifier associated with a user;
   assigning the request to an application server from among a plurality of application servers;
   the assigned application server determining whether a session associated with the login identifier is active;
   if the session is active, the assigned application server determining whether a received session number associated with the login identifier is the same as a session number stored in a central data server of the computer network; and if the received session number is not the same as the stored session number, then invalidating the session associated with a selected one of the stored session number and the received session number.

2. The method of claim 1, wherein invalidating the session includes querying the client device as to which session is to be invalidated.

3. The method of claim 1, wherein the session associated with the stored session number is invalidated.

4. The method of claim 1, wherein if the session is inactive, the method further comprises:

the assigned application server obtaining a session number from a parameter table of the central data server;

setting the session number to be associated with the login identifier in a user session index of the central data server; and incrementing the session number to a next session number in the parameter table.

5. The method of claim 4, wherein obtaining the session number, setting the session number and incrementing the session number are performed as an atomic operation.

6. The method of claim 4, wherein the session number is incremented monotonically.

7. The method of claim 4, wherein the assigned server maintains session information for a given session, and the session number obtained from the central data server stored as part of the session information by the assigned server.

8. The method of claim 1, wherein the assigned server maintains any session information for a given session, and the session information is not managed by other ones of the plurality of application servers.

9. A system for session management, the system comprising:

a plurality of application servers, each application server including memory for storing data and instructions, and a processor for executing the instructions and managing the data; and a central data server coupled to each of the application servers, the central data server including a user session index and a parameter table;

wherein, upon receiving a request from a client device, the request is assigned to one of the plurality of application servers, the request including a login identifier associated with a user;

the assigned application server being configured to determine whether a session associated with the login identifier is active, if the session is active, the assigned application server determines whether a received session number associated with the login identifier is the same as a session number stored in the central data server, and if the received session number is not the same as the stored session number, then the session associated with a selected one of the stored session number and the received session number is invalidated.

10. The system of claim 9, wherein the session associated with the stored session number is invalidated by the application server managing that respective session.

11. The system of claim 9, wherein if the session is inactive, the assigned application server obtains a session number from the parameter table of the central data server, sets the session number to be associated with a login identifier in the user session index of the central data server, and increments the session number to a next session number in the parameter table of the central data server.

12. The system of claim 11, wherein the assigned application server obtains the session number, sets the session number and increments the session number as an atomic operation.

13. The system of claim 11, wherein the session number is incremented monotonically by the assigned application server.

14. The system of claim 11, wherein the assigned application server maintains session information for a given session, and the session number obtained from the central data server is stored as part of the session information by the assigned application server.

15. The system of claim 14, wherein the session information is not managed by other ones of the plurality of application servers.

16. The system of claim 9, wherein each of the plurality of application servers periodically polls the central data server to determine session status of sessions handled by each respective application server.

17. An apparatus for session management in a computer network, the apparatus comprising an application server including memory for storing session information and instructions, and a processor for executing the instructions and managing the session information;

the application server being coupled to a central data server storing a user session index and a parameter table for sessions of the computer network;

wherein, upon receiving a request from a client device, the request is assigned to the application server, the request including a login identifier associated with a user, and the application server is configured to:

determine whether a session associated with the login identifier is active, if the session is active, determine whether a received session number associated with the login identifier is the same as a session number stored in the central data server, and if the received session number is not the same as the stored session number, then the session associated with a selected one of the stored session number and the received session number is invalidated.

18. The apparatus of claim 17, wherein if the session is inactive, the application server obtains a session number from the parameter table of the central data server, sets the session number to be associated with a login identifier in the user session index of the central data server, and increments the session number to a next session number in the parameter table of the central data server.

19. The apparatus of claim 18, wherein the application server obtains the session number, sets the session number and increments the session number as an atomic operation.

* * * * *